United States Patent
Atsumi et al.

(10) Patent No.: US 10,358,168 B2
(45) Date of Patent: Jul. 23, 2019

(54) VEHICLE LOWER SECTION STRUCTURE

(71) Applicant: TOYOTA JIDOSHA KABUSHIKI KAISHA, Toyota-shi, Aichi-ken (JP)

(72) Inventors: Hyuga Atsumi, Nagoya (JP); Junichi Takayanagi, Nagoya (JP); Kenichiro Yoshimoto, Tokai (JP); Daisuke Tanabe, Nisshin (JP); Kyosuke Kawase, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/793,841

(22) Filed: Oct. 25, 2017

(65) Prior Publication Data

US 2018/0127032 A1 May 10, 2018

(30) Foreign Application Priority Data

Nov. 8, 2016 (JP) .................................. 2016-218460

(51) Int. Cl.
| | |
|---|---|
| *B62D 25/20* | (2006.01) |
| *B62D 21/15* | (2006.01) |
| *B62D 23/00* | (2006.01) |
| *B60K 1/04* | (2019.01) |

(52) U.S. Cl.
CPC ............... *B62D 25/20* (2013.01); *B60K 1/04* (2013.01); *B62D 21/15* (2013.01); *B62D 21/157* (2013.01); *B62D 23/005* (2013.01); *B60K 2001/0438* (2013.01); *B62D 25/2036* (2013.01)

(58) Field of Classification Search
CPC .... B62D 21/15; B62D 21/152; B62D 21/157; B62D 23/005
USPC ......... 296/204, 205, 203.02, 203.03, 203.04, 296/187.12, 187.09
See application file for complete search history.

(56) References Cited

U.S. PATENT DOCUMENTS

| | | | | |
|---|---|---|---|---|
| 3,614,124 | A | * | 10/1971 | Schwabenlender .... B62D 21/02 280/788 |
| 5,915,727 | A | * | 6/1999 | Bonnville ................ B60G 7/02 280/124.1 |
| 9,227,582 | B2 | * | 1/2016 | Katayama ................ B60K 1/04 |
| 2012/0251862 | A1 | | 10/2012 | Kano et al. |
| 2013/0113238 | A1 | | 5/2013 | Mildner et al. |
| 2014/0284125 | A1 | | 9/2014 | Katayama et al. |

FOREIGN PATENT DOCUMENTS

| | | |
|---|---|---|
| CN | 102729791 A | 10/2012 |
| DE | 102012019922 A1 | 4/2014 |
| EP | 1 077 172 A2 | 2/2001 |
| EP | 2 070 754 A1 | 6/2009 |
| EP | 2 505 459 A1 | 10/2012 |

(Continued)

*Primary Examiner* — Joseph D. Pape
(74) *Attorney, Agent, or Firm* — Oliff PLC

(57) ABSTRACT

A crossing member disposed along a vehicle width direction between inflected portions of side members is capable of transmitting load from one of the side members to the other of the side members when the one side member deforms toward a vehicle width direction inward. Accordingly, when collision load is input due to an offset collision or the like, the collision load is transmitted from the one side member input with the collision load to the other side member through the crossing member, and the collision load is supported by the other side member.

8 Claims, 9 Drawing Sheets

(56) References Cited

FOREIGN PATENT DOCUMENTS

| | | |
|---|---|---|
| JP | H07-246845 A | 9/1995 |
| JP | 3114484 B2 | 12/2000 |
| JP | 2001-055163 A | 2/2001 |
| JP | 2010-179898 A | 8/2010 |
| JP | 2010-254110 A | 11/2010 |
| WO | 2013/042628 A1 | 3/2013 |
| WO | 2015/049926 A1 | 4/2015 |

\* cited by examiner

VEHICLE LOWER SECTION STRUCTURE

CROSS-REFERENCE TO RELATED APPLICATION

This application claims priority under 35 USC 119 from Japanese Patent application No. 2016-218460 filed on Nov. 8, 2016, the disclosure of which is incorporated by reference herein.

BACKGROUND

Technical Field

The present disclosure relates to a vehicle lower section structure.

Related Art

Japanese Patent Application Laid-Open (JP-A) No. 2010-179898 describes an invention relating to a vehicle body front section structure of a vehicle. This vehicle body front section structure of a vehicle includes a pair of front side frames extending in a vehicle front-rear direction, and a pair of floor frames extending in the vehicle front-rear direction. The floor frames are provided so as to continue from vehicle rear end portions of the respective front side frames, and are disposed at a vehicle lower side of a floor panel. Namely, part of a vehicle body frame extending in the vehicle front-rear direction is configured by the front side frames and the floor frames. Moreover, a floor sub frame extends from a length direction central portion of each floor frame toward a tunnel section provided to the floor panel. Vehicle rear end portions of the floor sub frames are coupled together by reinforcement disposed straddling the tunnel section. Accordingly, the technology described in JP-A No. 2010-179898 enables the rigidity of the vehicle body with respect to collision load in a frontal collision or the like to be improved.

However, in JP-A No. 2010-179898, each of the front side frames extends along the vehicle front-rear direction in a straight line, whereas the floor frames extend so as to spread out from the vehicle rear end portions of the respective front side frames toward the vehicle width direction outward. Accordingly, when collision load due to an offset collision or the like is input to the vehicle, it is conceivable that stress might concentrate at a connection portion between the front side frame and the floor frame, consequently causing the vehicle body frame extending in the vehicle front-rear direction to undergo folding deformation so as to protrude toward the vehicle width direction inward. Namely, the technology in JP-A No. 2010-179898 leaves room for improvement regarding the point of suppressing deformation of a vehicle body frame extending in the vehicle front-rear direction such that the vehicle body frame protrudes toward the vehicle width direction inward as a result of collision load in an offset collision or the like.

In cases in which the technology in JP-A No. 2010-179898 is applied to a vehicle body of an electric vehicle, it is preferable to be able to secure a large space at a vehicle lower side of the floor panel in which to dispose a power supply section such as a battery that supplies power to a power unit. However, in JP-A No. 2010-179898, the floor sub frames and reinforcement are disposed at the vehicle lower side of the floor panel, thus leaving room for improvement regarding the point of securing a large space in which to dispose a power supply section.

SUMMARY

The present disclosure obtains a vehicle lower section structure capable of suppressing a vehicle body frame extending in a vehicle front-rear direction from deforming so as to protrude toward a vehicle width direction inward as a result of collision load in an offset collision or the like, and also capable of securing a large space in which to dispose a power supply section at a vehicle lower side of a floor panel.

A first aspect of the present disclosure is a vehicle lower section structure including a floor panel configuring part of a floor section of a vehicle body having a monocoque structure, and a pair of left and right side members configuring part of a frame extending in a vehicle front-rear direction of the vehicle body. Each side member includes (i) a side member front extending straight along the vehicle front-rear direction as viewed along a vehicle vertical direction, and (ii) a side member rear joined to the floor panel at a vehicle lower side of the floor panel, and provided with an inflected portion extending from the side member front so as to spread out toward a vehicle width direction outward as viewed along the vehicle vertical direction. The vehicle lower section structure further includes a power supply section disposed between the side members at a vehicle lower side of the floor panel and configured to supply power to a power unit installed at the vehicle, and a crossing section running along the vehicle width direction between the inflected portions and configured to transmit load from one of the side members to the other of the side members in a case in which the one side member deforms toward the vehicle width direction inward.

According to the first aspect described above, part of the floor section of the vehicle body having a monocoque structure is configured by the floor panel, and part of the frame extending in the vehicle front-rear direction of the vehicle body is configured by the pair of left and right side members, each of which includes the side member front and the side member rear. Moreover, each side member rear is joined to the floor panel at the vehicle lower side of the floor panel, and the power supply section is disposed between the side members at the vehicle lower side of the floor panel. The power supply section is capable of supplying power to the power unit installed to the vehicle.

Note that in the present disclosure, each side member rear is provided with the inflected portion extending from the side member front so as to spread out toward the vehicle width direction outward as viewed along the vehicle vertical direction. Accordingly, a space that is between the side members and at the vehicle lower side of the floor panel, namely a space in which the power supply section is disposed, can be made larger than in a configuration in which the side member rear continues to extend straight toward the vehicle rear from the side member fronts.

Note that as viewed along the vehicle vertical direction, each of the side members extends straight along the vehicle front-rear direction at the side member front portion; however, the side members are bent toward the vehicle width direction outward as described above at the locations provided with the inflected portions. Note that here, "straight" also encompasses states in which the side member fronts extend at a slight angle toward the vehicle width direction. Accordingly, when collision load is input to the vehicle in an offset collision or the like, it is conceivable that the side member might deform so as to protrude toward the vehicle width direction inward at the inflected portion.

However, in the present disclosure, when one of the side members deforms toward the vehicle width direction inward, load can be transmitted from the one side member to the other side member through the crossing section disposed along the vehicle width direction between the inflected portions of the side members. Accordingly, when collision load is input to the vehicle in an offset collision or the like, the collision load is transmitted from the one side member into which the collision load was input to the other side member through the crossing section, and the collision load is supported by the other side member.

A second aspect of the present disclosure is the vehicle lower section structure of the first aspect, further including a torque box disposed at the vehicle width direction outer side of the side member, wherein a vertical wall of the torque box at the vehicle rear of the torque box as viewed along the vehicle width direction is disposed at a position overlapping with a vertical wall at the vehicle rear of the crossing section, and is joined to the side member and to a rocker extending in the vehicle front-rear direction along a peripheral edge on the vehicle width direction outer side of the floor panel.

According to the second aspect, the torque box is disposed at the vehicle width direction outer side of the side member, and the torque box is joined to the side member and to the rocker extending in the vehicle front-rear direction along the peripheral edge on the vehicle width direction outer side of the floor panel. Accordingly, collision load input to the side member in an offset collision or the like is dispersed into the rocker through the torque box.

Note that in an offset collision of the vehicle, it is conceivable that a front wheel moving under collision load might impact a vehicle front portion of the rocker. In such an event, it is conceivable that a moment might arise in the torque box about an axis in the vehicle vertical direction so as to pivot about a vehicle front portion of the joint portion between the torque box and the rocker, and that this moment would act on as a bending moment on the side members.

However, in the present disclosure, as viewed along the vehicle width direction, the vertical wall at the vehicle rear of the torque box is disposed at a position overlapping with the vertical wall at the vehicle rear of the crossing section. Note that here, "overlapping positions" encompass not only a position where the vertical wall of the torque box and the vertical wall of the crossing section overlap fully, but also positions where the vertical wall of the torque box and the vertical wall of the crossing section are offset in the vehicle front-rear direction such that they partially overlap, and positions in which they intersect so as to partially overlap. Accordingly, a moment arising in the torque box due to the front wheel moving under the collision load is countered by the vertical wall of the torque box being supported by the vertical wall of the crossing section through the side member.

A third aspect of the present disclosure is the vehicle lower section structure of either the first aspect or the second aspect, wherein as viewed along the vehicle width direction, a lower side wall configuring the vehicle lower side of the crossing section is disposed so as to overlap with a lower wall configuring a vehicle lower side portion of the side member, or is coupled to the lower wall. The load can be transmitted from the lower wall to the lower side wall.

According to the third aspect described above, as viewed along the vehicle width direction, the lower side wall configuring the vehicle lower side of the crossing section is disposed so as to overlap with the lower wall configuring the vehicle lower side portion of the side member, or is coupled to the lower wall. When one of the side members deforms toward the vehicle width direction inward, load can be transmitted from the lower wall of that side member to the lower side wall of the crossing section. Accordingly, when collision load is input to the vehicle in an offset collision or the like, the lower wall of the side member is supported by the lower side wall of the crossing section, and as a result, a moment about an axis along the vehicle front-rear direction can be suppressed from arising in the side member.

A fourth aspect of the present disclosure is the vehicle lower section structure of any one of the first aspect to the third aspect, wherein a reinforcement section serving as the crossing section is disposed inside a battery case configuring an outer shell of the power supply section. The reinforcement section is configured so as to deform less readily than the battery case with respect to the load.

According to the fourth aspect, the reinforcement section running along the vehicle width direction between the inflected portions of the side members is disposed inside the battery case configuring the outer shell of the power supply section. Moreover, the reinforcement section is configured so as to deform less readily than the battery case with respect to the load input when one of the side members deforms toward the vehicle width direction inward. Note that here, "deform less readily" means that were loads of equivalent magnitude toward the vehicle width direction inward to be input to the reinforcement section and the battery case respectively, a displacement amount (deformation stroke) from an initial position of a vehicle width direction outer side end portion of the reinforcement section would be smaller than a displacement amount from an initial position of a vehicle width direction outer side portion of the battery case.

Accordingly, a load transmission path from one side member to the other side member when the one side member deforms toward the vehicle width direction inward is configured by the reinforcement section, enabling the load to be supported by the other side member.

A fifth aspect of the present disclosure is the vehicle lower section structure of the fourth aspect, wherein the battery case is fixed to a lower wall configuring a vehicle lower side portion of the side member via a fastening member.

According to the fifth aspect, the battery case is fixed to the lower wall configuring the vehicle lower side portion of the side member using the fastening member, such that a fixing operation is rendered easier than in cases in which, for example, the battery case is fixed to a side wall of the side member. Note that it is conceivable that stress might concentrate at the fastening location of the fastening member as a result of compression load or tensile load acting on the side wall of the side member when the side member deforms as a result of collision load in an offset collision or the like. Regarding this point, in the present disclosure, stress can be suppressed from concentrating at the fastening location of the fastening member by fixing the battery case to the lower wall of the side member as described above.

A sixth aspect of the present disclosure is the vehicle lower section structure of any one of the first aspect to the fifth aspect, wherein as viewed along the vehicle vertical direction, the crossing section is disposed on a straight line connecting an inflection point between the side member front and the side member rear of one of the side members to an inflection point between the side member front and the side member rear of the other of the side members.

According to the sixth aspect described above, as viewed along the vehicle vertical direction, the one side member is bent toward the vehicle width direction outward about a boundary at the inflection point between the side member front and the side member rear of the one side member. Moreover, as viewed along the vehicle vertical direction, the other side member is bent toward the vehicle width direction outward about a boundary at the inflection point between the side member front and the side member rear of the other side member. Accordingly, were the crossing section not provided, when collision load is input to either the side member on one side or the side member on the other side in an offset collision or the like, the side member into which the collision load was input would undergo folding deformation originating at the inflection point.

However, in the present disclosure, as viewed along the vehicle vertical direction, the crossing section is disposed on the straight line connecting the inflected portions together. Accordingly, when one or the other side member is input with collision load in an offset collision or the like, the side member input with collision load can be supported at a location where deformation would otherwise originate.

A seventh aspect of the present disclosure is a vehicle lower section structure including a floor panel configuring part of a floor section of a vehicle body having a monocoque structure, and a pair of left and right side members configuring part of a frame extending in a vehicle front-rear direction of the vehicle body. Each side member includes a side member front extending straight along the vehicle front-rear direction as viewed along a vehicle vertical direction, and a side member rear joined to the floor panel at a vehicle lower side of the floor panel, and provided with an inflected portion extending from the side member front so as to spread out toward a vehicle width direction outward as viewed along the vehicle vertical direction. The vehicle lower section structure further includes a power supply section disposed between the side members at a vehicle lower side of the floor panel and configured to supply power to a power unit installed at the vehicle, and a crossing section coupling the side members together. As viewed along the vehicle vertical direction, the crossing section is disposed between the inflected portions on a straight line connecting an inflection point between the side member front and the side member rear of one of the side members to an inflection point between the side member front and the side member rear of the other of the side members.

The seventh aspect described above has the same basic configuration as the first aspect, and exhibits similar operation thereto. Moreover, in the present disclosure, as viewed along the vehicle vertical direction, the crossing section is disposed between the inflected portions, on the straight line connecting the inflection point of the one side member to the inflection point of the other side member, and the crossing section couples the side members together. Accordingly, when a collision load is input to the vehicle due to an offset collision or the like, the collision load is directly transmitted from the location of the one side member input with the collision load where deformation would otherwise originate to the other side member through the crossing section, and the collision load is supported by the other side member.

As described above, the vehicle lower section structure according to the first aspect is capable of suppressing the vehicle body frame extending in the vehicle front-rear direction from deforming so as to protrude toward the vehicle width direction inward as a result of collision load in an offset collision or the like, and is also capable of securing a large space in which to dispose the power supply section at the vehicle lower side of the floor panel.

The vehicle lower section structure according to the second aspect is capable of suppressing a front wheel moving under collision load from affecting the vehicle body frame extending in the vehicle front-rear direction when collision load is input in an offset collision or the like.

The vehicle lower section structure according to the third aspect is capable of supporting the vehicle body frame extending along the vehicle front-rear direction in a stable state when collision load is input in an offset collision or the like.

The vehicle lower section structure according to the fourth aspect is capable of suppressing the vehicle body frame extending along the vehicle front-rear direction from deforming as a result of collision load in an offset collision or the like so as to protrude toward the vehicle width direction inward, without any additional members on the vehicle body side.

The vehicle lower section structure according to the fifth aspect is capable of raising the efficiency of a fixing operation of the power supply section, and is also capable of suppressing the power supply section from separating from the vehicle body when collision load is input to the vehicle body in an offset collision or the like.

The vehicle lower section structure according to the sixth aspect is capable of supporting collision load in an initial input stage of collision load input resulting from an offset collision or the like.

The vehicle lower section structure according to the seventh aspect is capable of suppressing the vehicle body frame extending in the vehicle front-rear direction from deforming as a result of collision load in an offset collision or the like so as to protrude toward the vehicle width direction inward, and is also capable of securing a large space in which to dispose the power supply section at the vehicle lower side of the floor panel.

BRIEF DESCRIPTION OF THE DRAWINGS

Exemplary embodiments of the present disclosure will be described in detail based on the following figures, wherein.

DETAILED DESCRIPTION

First Exemplary Embodiment

Explanation follows regarding a first exemplary embodiment of a vehicle lower section structure according to the present disclosure, with reference to FIG. 1 to FIG. 6. Note that in each of the drawings, the arrow FR indicates a vehicle front, the arrow UP indicates upward in the vehicle, and the arrow LH indicates left in a vehicle width direction, as appropriate.

Figure 5:
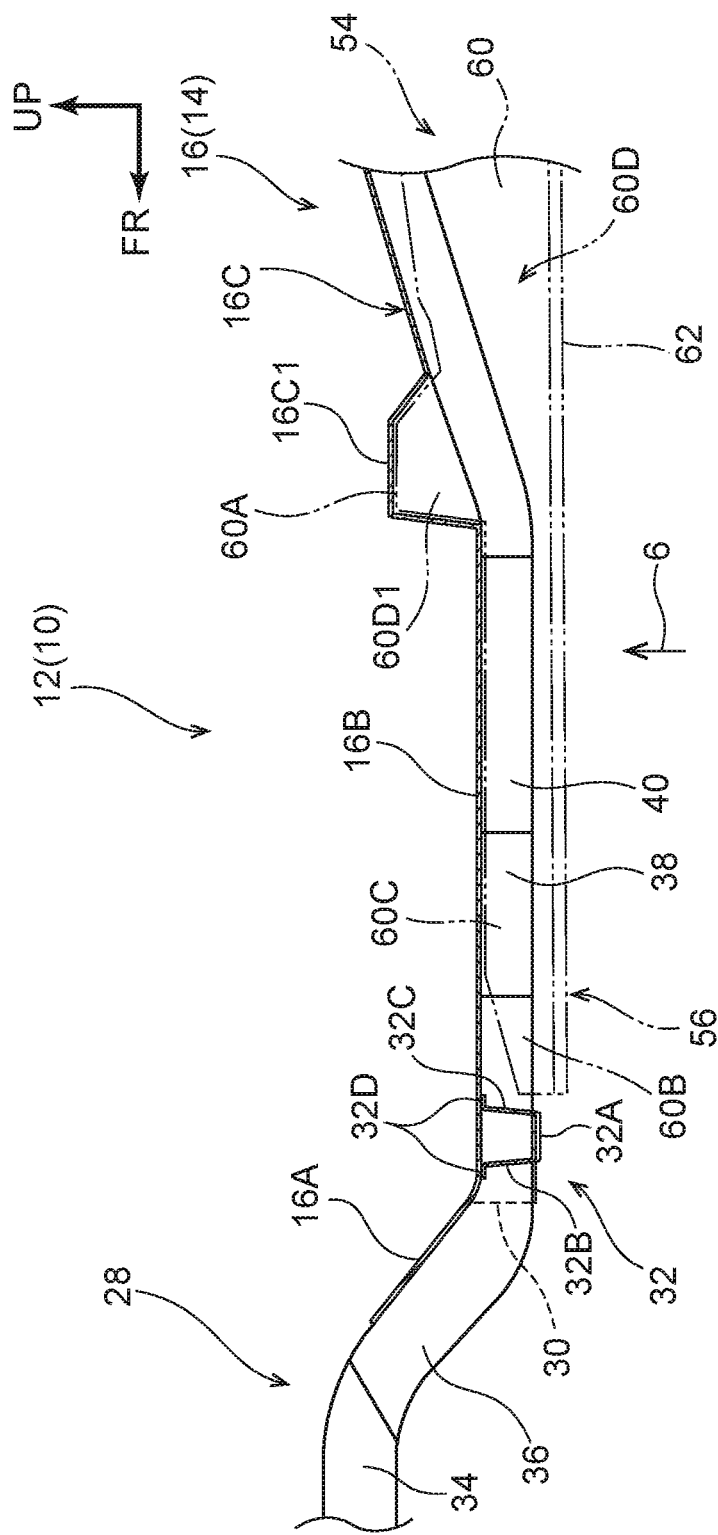
FIG. 5 is a cross-section (cross-section illustrating a state sectioned along line 5-5 in FIG. 6) illustrating configuration of a floor section of a vehicle applied with a vehicle lower section structure according to the first exemplary embodiment, as viewed from a vehicle width direction outer side.
Figure 6:
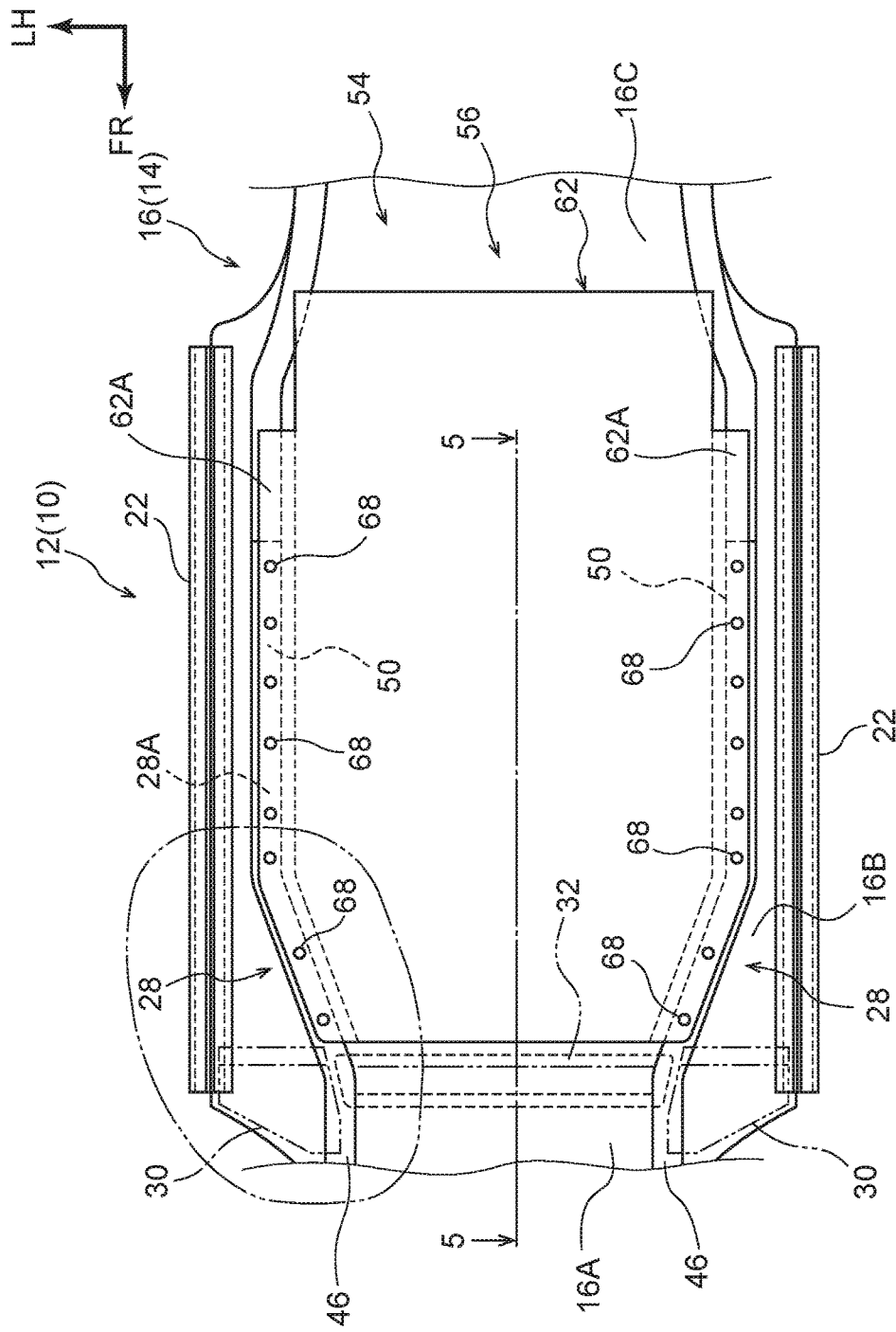
FIG. 6 is a bottom view (as viewed along the direction of arrow 6 in FIG. 5) illustrating configuration of a floor section in a vehicle applied with a vehicle lower section structure according to the first exemplary embodiment, as viewed from a vehicle lower side.

First, explanation follows regarding a whole configuration of a vehicle 10 applied with a vehicle lower section structure according to the present exemplary embodiment, with reference to FIG. 5 and FIG. 6. Note that in the present exemplary embodiment, the vehicle 10 is basically configured with left-right symmetry, and so the following explanation of the vehicle 10 focusses mainly on configuration of a vehicle width direction left section. Explanation regarding configuration on a vehicle width direction right section is omitted as appropriate.

The vehicle 10 is configured including a vehicle body 12; a power unit such as a motor, not illustrated in the drawings, installed in the vehicle 10; and a battery pack 54, serving as a power supply section, described later, that is attached to the vehicle body 12. The power unit is driven by receiving power supplied from the battery pack 54, and the vehicle 10 travels using drive force generated by the power unit.

The vehicle body 12 has a monocoque structure, and includes a floor panel 16 that configures part of a floor section 14 at a vehicle lower side of the vehicle body 12, and that extends in a vehicle front-rear direction and the vehicle width direction as viewed along a vehicle vertical direction. The floor panel 16 is pressed from sheet steel and is configured including a front panel section 16A (referred to below as the F-panel section 16A) mainly configuring a vehicle front section of the floor panel 16, a center panel section 16B (referred to below as the C-panel section 16B) configuring a vehicle front-rear direction central section of the floor panel 16, and a rear panel section 16C (referred to below as the R-panel section 16C) configuring a vehicle rear section of the floor panel 16.

Figure 2:
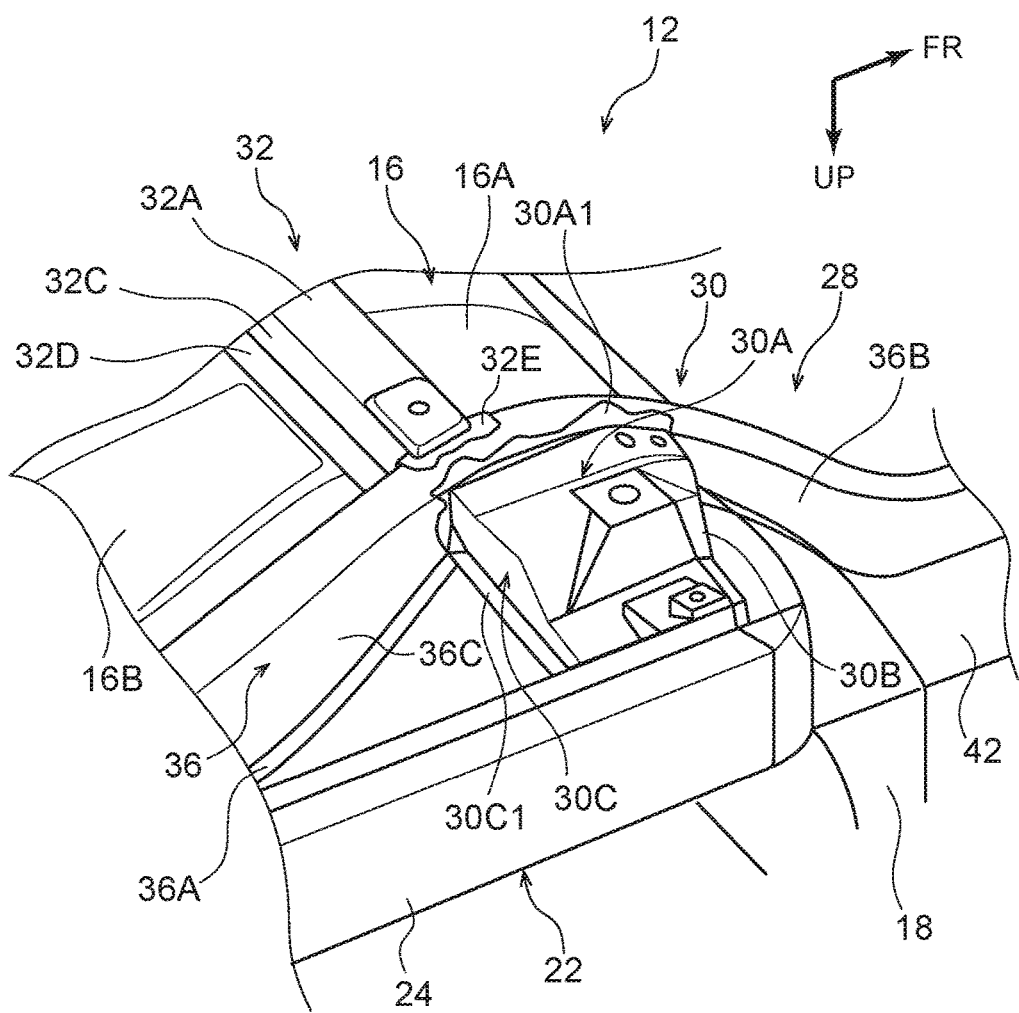
FIG. 2 is a perspective view (as viewed along the direction of arrow 2 in FIG. 1) schematically illustrating configuration of relevant portions of a vehicle body of a vehicle applied with a vehicle lower section structure according to the first exemplary embodiment, as viewed from a vehicle lower outer side.

More specifically, the F-panel section 16A is configured in a plate shape that curves or bends so as to form a protrusion toward the front and downward in the vehicle when viewed in cross-section along the vehicle width direction, and that extends in the vehicle width direction. As illustrated in FIG. 2, a vehicle lower side portion of a dash panel 18 extending in the vehicle width direction and extending upward in the vehicle from the F-panel section 16A is joined to a vehicle upper side portion of the F-panel section 16A at a joint portion, not illustrated in the drawings, by welding or the like. A vehicle width direction outer side portion of the F-panel section 16A is joined to a portion of the dash panel 18 configuring a wheelhouse for a front wheel at a joint portion, not illustrated in the drawings, by welding or the like so as to configure part of the wheelhouse. Namely, the F-panel section 16A is integrally provided to the dash panel 18 of the vehicle body 12, and may be considered to serve as part of the dash panel 18.

Figure 1:
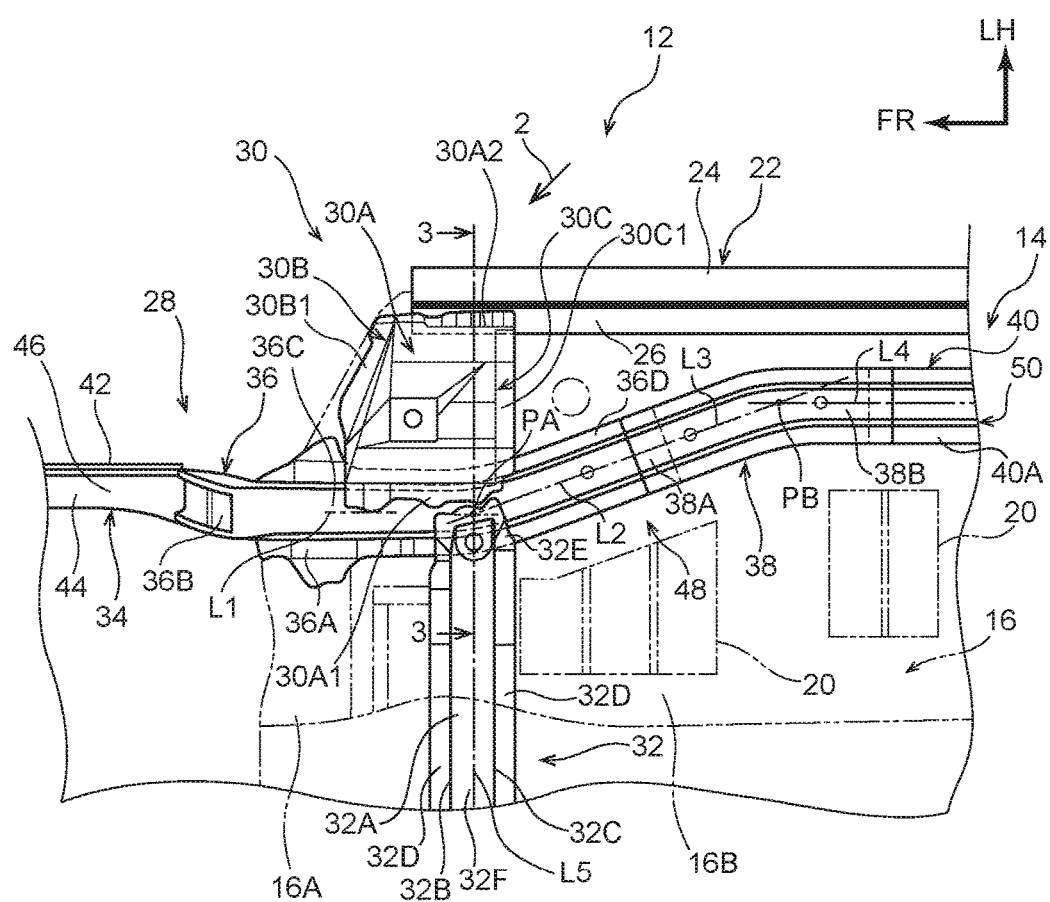
FIG. 1 is an enlarged bottom view (an enlarged view illustrating the portion enclosed by double-dotted dashed lines in FIG. 6) illustrating configuration of relevant portions of a vehicle body of a vehicle applied with a vehicle lower section structure according to a first exemplary embodiment, as viewed from a vehicle lower side.

The C-panel section 16B is configured in a plate shape extending uniformly so as to extend in the vehicle front-rear direction and the vehicle width direction, and is reinforced by the formation of plural beads 20, as illustrated in FIG. 1. The R-panel section 16C is formed with a bulge 16C1 that bulges so as to form a protrusion upward in the vehicle. A vehicle width direction dimension of the bulge 16C1 is set to a length of approximately 60% to 70% that of a vehicle width direction dimension of the R-panel section 16C. As will be described in detail later, part of the battery pack 54 is housed inside the bulge 16C1.

A pair of left and right steel rockers 22 are disposed running along vehicle width direction outer peripheral edges of the floor panel 16 at vehicle width direction outer sides of the floor panel 16. The rockers 22 extend in the vehicle front-rear direction and are each configured including a rocker outer 24 configuring a vehicle width direction outer side portion of the rocker 22, and a rocker inner 26 configuring a vehicle width direction inner side portion of the rocker 22.

Figure 3:
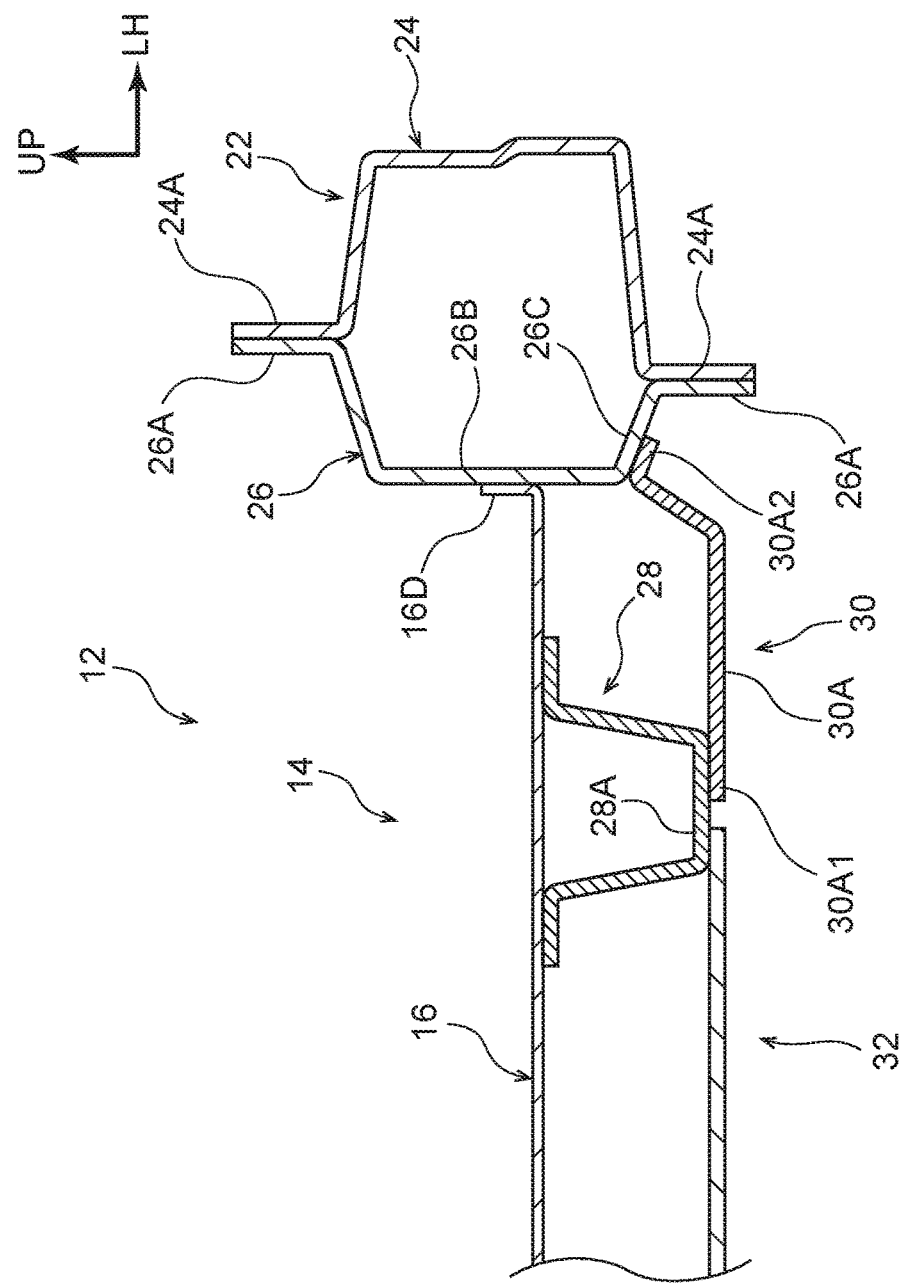
FIG. 3 is a cross-section (cross-section illustrating a state sectioned along line 3-3 in FIG. 1) illustrating configuration of relevant portions of a vehicle body of a vehicle applied with a vehicle lower section structure according to the first exemplary embodiment, as viewed from the vehicle front.

More specifically, as also illustrated in FIG. 3, a cross-section profile of the rocker outer 24 as viewed along the vehicle front-rear direction is configured in a hat shape opening toward the vehicle width direction inward. The rocker inner 26 is configured so as to be basically symmetrical to the rocker outer 24 about an axis extending in the vehicle vertical direction, and a cross-section profile of the rocker inner 26 as viewed along the vehicle front-rear direction is configured in a hat shape opening toward the vehicle width direction outward. Flanges 24A of the rocker outer 24 and flanges 26A of the rocker inner 26 are respectively joined together at joint portions, not illustrated in the drawings, by welding or the like, thereby configuring a closed cross-section structure with a substantially hexagonal closed cross-section profile as viewed along the vehicle front-rear direction. Note that a vehicle width direction outer side end portion 16D of the floor panel 16 is joined to a side wall 26B configuring a vehicle width direction inner side portion of the rocker inner 26 at a joint portion, not illustrated in the drawings, by welding or the like.

Note that a first feature of the present exemplary embodiment is the configuration of a pair of left and right side members 28 configuring part of a frame extending in the vehicle front-rear direction of the vehicle body 12. A second feature is the configuration of torque boxes 30 interposed between the rockers 22 and the side members 28. A third feature relates to the point that the side members 28 are coupled together by a crossing member 32, serving as a crossing section. Detailed explanation follows regarding configuration of the side members 28, the torque boxes 30, and the crossing member 32, these configuring relevant portions of the present exemplary embodiment.

First, explanation follows regarding configuration of the side members 28, with reference mainly to FIG. 1 to FIG. 3. Each side member 28 includes a side member front section 34, a kick section 36, a coupling section 38, and a floor side section 40, disposed in this sequence from the vehicle front. The side members 28 are, for example, configured from steel members.

The side member front section 34 configures a vehicle front section of the side member 28 and extends straight along the vehicle front-rear direction. A front section outer 42 configuring a vehicle width direction outer side portion of the side member front section 34, and a front section inner 44 configuring a vehicle width direction inner side portion of the side member front section 34, configure the side member front section 34 with a closed cross-section structure having a rectangular shaped closed cross-section profile as viewed along the vehicle front-rear direction. Note that a crash box and bumper reinforcement, not illustrated in the drawings, are attached to a vehicle front end portion of the side member front section 34.

As illustrated in FIG. 5, as viewed along the vehicle width direction the kick section 36 extends downward and toward the rear of the vehicle from a vehicle rear portion of the side member front section 34. The kick section 36 is provided running along a vehicle lower side of the dash panel 18 and the floor panel 16. The cross-section profile of the kick section 36 as viewed along its extension direction is basically configured in a hat shape opening toward the F-panel section 16A side. Moreover, a closed cross-section structure is configured by the kick section 36 and the floor panel 16 by joining flanges 36A of the kick section 36 to a vehicle lower side face of the floor panel 16 at joint portions, not illustrated in the drawings, by welding or the like.

More specifically, the kick section 36 is configured including a front portion 36B configuring a vehicle front portion of the kick section 36, a central portion 36C configuring an extension direction central portion of the kick section 36, and a rear portion 36D configuring a vehicle rear portion of the kick section 36. The front portion 36B is disposed straddling the dash panel 18 and the F-panel section 16A, and the central portion 36C extends from the front portion 36B toward the vehicle rear.

The central portion 36C is disposed straddling the F-panel section 16A and the C-panel section 16B, and has a uniform cross-section profile as viewed along the extension direction of the kick section 36. The central portion 36C extends straight along the vehicle front-rear direction as viewed along the vehicle vertical direction. The rear portion 36D extends from the central portion 36C toward the vehicle rear.

The rear portion 36D is disposed along the C-panel section 16B, and has a uniform cross-section profile as viewed along the extension direction of the kick section 36. The rear portion 36D extends straight from the central portion 36C toward the vehicle rear and outward as viewed along the vehicle vertical direction. Namely, as viewed along the vehicle vertical direction, the kick section 36 configured as described above is bent so as to form a protrusion toward the vehicle width direction inward overall. A point of intersection between a central line L1 extending along the extension direction of the central portion 36C and a central line L2 extending along the extension direction of the rear portion 36D configures an "inflection point PA" of the kick section 36, and therefore also of the side member 28.

The floor side section 40 extends straight along the vehicle front-rear direction at a vehicle lower side of the C-panel section 16B, in a state at a predetermined spacing from the rocker 22 in the vehicle width direction. As viewed along the vehicle front-rear direction, a cross-section profile of the floor side section 40 is configured with a hat shape opening at the floor panel 16 side. Flanges 40A of the floor side section 40 are joined to the vehicle lower side face of the floor panel 16 at joint portions, not illustrated in the drawings, by welding or the like. A closed cross-section structure with a rectangular shaped closed cross-section profile as viewed along the vehicle front-rear direction is thereby configured by the floor side section 40 and the floor panel 16. A vehicle front end portion of the floor side section 40 is coupled to a vehicle rear end portion of the kick section 36 by the coupling section 38.

A cross-section profile of the coupling section 38 is uniform along the extension direction of the coupling section 38 as viewed along this extension direction, and is configured with a hat shape opening on the floor panel 16 side. The coupling section 38 is configured including a front portion 38A configuring a vehicle front portion of the coupling section 38, and a rear portion 38B configuring a vehicle rear portion of the coupling section 38.

The front portion 38A extends along the extension direction of the rear portion 36D of the kick section 36, and a vehicle front end portion of the front portion 38A is disposed in a state overlapping a vehicle rear end portion of the rear portion 36D from the vehicle lower side. The rear portion 38B extends along the extension direction of the floor side section 40, and a vehicle rear end portion of the rear portion 38B is disposed in a state overlapping a vehicle front end portion of the floor side section 40 from the vehicle lower side. A closed cross-section structure is configured by the coupling section 38 and the floor panel 16 by joining flanges 38C of the coupling section 38 to the vehicle lower side face of the floor panel 16 at joint portions, not illustrated in the drawings, by welding or the like. Note that the coupling section 38 is joined to the kick section 36 and the floor side section 40 in a similar manner as with to the floor panel 16.

Moreover, as viewed along the vehicle vertical direction, the coupling section 38 configured as described above is bent so as to form a protrusion toward the vehicle width direction outward overall. An point of intersection between a central line L3 extending along the extension direction of the front portion 38A and a central line L4 extending along the extension direction of the rear portion 38B configures an inflection point PB of the coupling section 38, and therefore of the side member 28.

As viewed along the vehicle vertical direction, of the side member 28 configured as described above, a section configured including the side member front section 34 and the front portion 36B and central portion 36C of the kick section 36 extends straight along the vehicle front-rear direction. Note that in the following explanation, this section is referred to as the side member front 46. Depending on the configuration of the vehicle 10 and the like, the side member front 46 may also be configured so as to extend at a slight angle with respect to the vehicle width direction.

As viewed along the vehicle vertical direction, a section configured including the rear portion 36D of the kick section 36 and the front portion 38A of the coupling section 38 extends so as to spread out from the side member front 46 toward the vehicle width direction outward. Note that in the following explanation, a portion including the inflection points PA, PB is referred to as the inflected portion 48. Moreover, in the following explanation, of the side member 28, a section that is further to the vehicle rear than the side member front 46 and that includes the inflected portion 48 and the floor side section 40 is referred to as the side member rear 50. Moreover, as illustrated in FIG. 5 and FIG. 6, the battery pack 54 is attached to the side members 28.

The battery pack 54 is configured including an aluminum battery case 56 serving as a battery case configuring an outer shell of the battery pack 54, and battery modules 58 disposed inside the battery case 56. See the battery module 58 illustrated in FIG. 8, referred to later in the explanation of the second exemplary embodiment.

The battery case 56 includes a cover 60 that covers the battery modules 58 from the vehicle upper side, and a base 62 that supports the battery modules 58 from the vehicle lower side. The cover 60 is configured so as to fit between the side members 28 and is configured including an upper wall 60A configuring a vehicle upper portion of the cover 60, and a pair of side walls 60B configuring vehicle width direction outer side portions of the cover 60 and disposed with their plate thickness direction in the vehicle width direction.

A front portion 60C at the vehicle front of the cover 60 is configured with a basically uniform dimension in the vehicle vertical direction. A vehicle front-rear direction dimension of the front portion 60C is set to approximately 60% of a vehicle front-rear direction dimension of the overall cover 60. At the vehicle rear of the upper wall 60A, a rear portion 60D at the vehicle rear of the cover 60 includes a bulge 60D1 having a shape slightly smaller than the bulge 16C1 of the floor panel 16. A vehicle vertical direction dimension of the rear portion 60D is set longer than the vehicle vertical direction dimension of the front portion 60C. Namely, as viewed along the vehicle width direction, the cover 60 is configured in a stepped shape so as to be taller at the vehicle rear. Moreover, viewing the cover 60 along the vehicle vertical direction, a vehicle front portion of the front portion 60C, namely a portion disposed between the inflected portions 48, becomes wider on progression toward the vehicle rear side, corresponding to the shape of the inflected portions 48.

The base 62 is configured in a plate shape that is slightly larger than the cover 60 as viewed along the vehicle vertical direction, and with a plate thickness that is set thicker than the plate thickness of the cover 60. Moreover, the cover 60 is attached to the base 62 using fastening members or the like, not illustrated in the drawings, in a state in which the cover 60 has been placed at the vehicle upper side of the base 62.

To explain with reference to FIG. 8, referred to later in the description of the second exemplary embodiment, a vehicle width direction outer side edge 62A (the edge 88A in FIG. 8) of the base 62 is provided with plural insertion portions 64 at predetermined spacings along the edge 62A. A lower wall 28A configuring a vehicle lower side portion of the side member 28, or more specifically a vehicle upper side face of a portion of the lower wall 28A on the side member rear 50 side, is provided with plural fastened members 66 such as weld nuts, corresponding to the insertion portions 64. The battery case 56 is fixed to the vehicle body 12 by inserting fastening members 68 such as bolts into the insertion portions 64 from the vehicle lower side and fastening the fastening members 68 to the fastened members 66. Note that a collar 70 is disposed between the base 62 and the lower wall 28A.

Inside the battery case 56, plural of the battery modules 58 are arranged in a row along the vehicle front-rear direction, so as to be disposed in a single tier inside the front portion 60C, and in three tiers in the vehicle vertical direction inside the rear portion 60D. Note that in a state in which the battery pack 54 is attached to the vehicle body 12, the bulge 60D1 of the cover 60, and the third tier of battery modules 58 disposed inside the bulge 60D1, are disposed inside the bulge 16C1 of the R-panel section 16C. Moreover, the battery pack 54 is disposed in a state at a predetermined spacing from the floor panel 16.

As illustrated in FIG. 1 and FIG. 2, each torque box 30 is configured including a bottom wall 30A configuring a vehicle rear portion of the torque box 30, a front wall 30B configuring the vehicle front of the torque box 30, and a rear wall 30C, serving as a vertical wall configuring a vehicle rear portion of the torque box 30.

As viewed along the vehicle vertical direction, the bottom wall 30A is configured in a substantially rectangular plate shape with its plate thickness direction running in the vehicle vertical direction, and is disposed so as to overlap with the F-panel section 16A and the C-panel section 16B. From the bottom wall 30A, an inward flange 30A1 extending from a peripheral edge on the vehicle width direction inner side of the bottom wall 30A extends out toward the vehicle width direction inward. Moreover, as also illustrated in FIG. 3, at a vehicle lower side face of a portion on the side member front 46 side of the lower wall 28A, the inward flange 30A1 is joined to the lower wall 28A at a joint portion, not illustrated in the drawings, by welding or the like.

The bottom wall 30A is also provided with an inclined portion running from a vehicle lower inner side toward the vehicle upper outward, and an outward flange 30A2 extending out from a vehicle width direction outer peripheral edge of the inclined portion toward the vehicle width direction outward. The outward flange 30A2 is joined to a lower wall 26C configuring a vehicle lower side portion of the rocker inner 26 at a joint portion, not illustrated in the drawings, by welding or the like.

The front wall 30B extends out toward the vehicle upper side from a peripheral edge at the vehicle front of the bottom wall 30A, and is configured in a plate shape with its plate thickness direction running in the vehicle front-rear direction. Moreover, a forward flange 30B1 extending toward the vehicle front extends out from a vehicle upper peripheral edge of the front wall 30B. The forward flange 30B1 is joined to the F-panel section 16A at a joint portion, not illustrated in the drawings, by welding or the like.

The rear wall 30C extends out toward the vehicle upper side from a vehicle rear peripheral edge of the bottom wall 30A, and is configured in a plate shape with its plate thickness direction running in the vehicle front-rear direction. Moreover, a rearward flange 30C1 extending toward the vehicle rear extends out from a vehicle upper peripheral edge of the rear wall 30C. The rearward flange 30C1 is joined to the C-panel section 16B at a joint portion, not illustrated in the drawings, by welding or the like. Moreover, the torque box 30 configured as described above forms a closed space together with the floor panel 16, the side member 28, and the rocker 22.

The crossing member 32 is disposed running along the vehicle width direction between the inflected portions 48, at the vehicle lower side of the floor panel 16. The crossing member 32 includes a lower side wall 32A, a front side wall 32B, a rear side wall 32C serving as a vertical wall, and a pair of flanges 32D. A cross-section profile of the crossing member 32 as viewed along the vehicle width direction is configured in a hat shape opening toward the vehicle upper side.

The lower side wall 32A configures a vehicle lower side portion of the crossing member 32, has a rectangular plate shape extending in the vehicle width direction, and is configured with its plate thickness direction running in the vehicle vertical direction. The front side wall 32B configures a vehicle front portion of the crossing member 32, and extends from a vehicle front peripheral edge of the lower side wall 32A toward the vehicle upper side. The front side wall 32B is configured in a rectangular plate shape extending in the vehicle width direction and is configured with its plate thickness direction running in the vehicle front-rear direction.

Moreover, the rear side wall 32C, configuring a vehicle rear portion of the crossing member 32, extends out from a vehicle rear peripheral edge of the lower side wall 32A toward the vehicle upper side. The rear side wall 32C has a rectangular plate shape extending in the vehicle width direction, and is configured with its plate thickness direction running in the vehicle front-rear direction. Note that the rear wall 30C of the torque box 30 described above is disposed at a position overlapping with the rear side wall 32C as viewed along the vehicle width direction. Specifically, as viewed along the vehicle width direction, the rear wall 30C of the torque box 30 and the rear side wall 32C of the crossing member 32 may be disposed overlapping each other fully, disposed offset in the vehicle front-rear direction so as to overlap each other partially, or disposed intersecting one another so as to overlap each other partially. Moreover, the flanges 32D extend out from a vehicle upper peripheral edge of the front side wall 32B toward the vehicle front, and from a vehicle upper peripheral edge of the rear side wall 32C toward the vehicle rear, respectively. The flanges 32D are joined to the floor panel 16 at joint portions, not illustrated in the drawings, by welding or the like.

An outward flange 32E extends out from a vehicle width direction outer peripheral edge of the lower side wall 32A toward the vehicle width direction outward, from a vehicle width direction outer peripheral edge of the front side wall 32B toward the vehicle front, and from a vehicle width direction outer peripheral edge of the rear side wall 32C toward the vehicle rear, respectively. The outward flange 32E is joined to the kick section 36 at a joint portion, not illustrated in the drawings, by welding or the like.

As viewed along the vehicle vertical direction, a center line running in the vehicle width direction at a portion of the crossing member 32, configured as described above, that is configured by the lower side wall 32A, the front side wall 32B, and the rear side wall 32C (referred to below as the bulge 32F) is disposed so as to overlap with a straight line L5 connecting between the respective inflection points PA described above. Note that the crossing member 32 does not necessarily have to be disposed such that the center line of the bulge 32F and the straight line L5 match up perfectly, and it is sufficient that the crossing member 32 be disposed such that part of the bulge 32F overlaps with the straight line L5.

Moreover, since the inflected portions 48 are coupled together as described above by the crossing member 32, when one of the side members 28 deforms toward the vehicle width direction inward, load can be transmitted from the one side member 28 to the other side member 28.

Moreover, together with the floor panel 16, the crossing member 32 configures a closed cross-section structure with a rectangular shaped closed cross-section profile as viewed along the vehicle width direction, and the floor panel 16 and the side members 28 form a closed space.

Operation of the Present Exemplary Embodiment

Next, explanation follows regarding operation of the present exemplary embodiment.

In the present exemplary embodiment, in the vehicle body 12 that has a monocoque structure, part of the floor section 14 is configured by the floor panel 16. Moreover, part of the frame extending in the vehicle front-rear direction of the vehicle body 12 is configured by the pair of left and right side members 28, each of which includes the side member front 46 and the side member rear 50. The side member rear 50 is joined to the floor panel 16 at the vehicle lower side of the floor panel 16, and the battery pack 54 is disposed between the side members 28 at the vehicle lower side of the floor panel 16. The battery pack 54 is capable of supplying power to the power unit installed to the vehicle 10.

Note that in the present exemplary embodiment, as viewed in the vehicle vertical direction, the respective side member rears 50 are provided with the inflected portions 48 that extend so as to spread out from the side member fronts 46 toward the vehicle width direction outward. Accordingly, the space that is between the side members 28 and at the vehicle lower side of the floor panel 16, namely the space in which the battery pack 54 is disposed, can be made larger than in a configuration in which the side member rears 50 continue to extend straight toward the vehicle rear from the side member fronts 46.

Note that as viewed along the vehicle vertical direction, each of the side members 28 extends straight along the vehicle front-rear direction at the side member front 46 portion; however, the side members 28 are bent toward the vehicle width direction outward as described above at the locations provided with the inflected portions 48. Accordingly, when collision load is input to the vehicle 10 in an offset collision or the like, stress readily concentrates at the inflected portions 48, as a result of collision load in an initial state of the collision, and as a result of inertial movement of a vehicle rear section of the vehicle 10 in a later stage of the collision. As a result, it is conceivable that the side members 28 might deform so as to protrude toward the vehicle width direction inward at the inflected portion 48, as illustrated by the double-dotted dashed lines in FIG. 4.

However, in the present exemplary embodiment, when one of the side members 28 deforms toward the vehicle width direction inward, load can be transmitted from the one side member 28 to the other of the side members 28 through the crossing member 32 disposed along the vehicle width direction between the inflected portions 48 of the side members 28. Accordingly, when collision load is input to the vehicle 10 in an offset collision or the like, the collision load is transmitted from the one side member 28 into which the collision load was input to the other side member 28 through the crossing member 32, and the collision load is supported by the other side member 28. Accordingly, the present exemplary embodiment enables deformation of the vehicle body frame extending in the vehicle front-rear direction so as to protrude toward the vehicle width direction inward as a result of collision load in an offset collision or the like to be suppressed, and enables a large space in which to dispose the battery pack 54 to be secured at the vehicle lower side of the floor panel 16.

Moreover, in the present exemplary embodiment, the torque boxes 30 are disposed at the vehicle width direction outer sides of the respective side members 28. Each torque box 30 is joined to the corresponding rocker 22 and side member 28 that extend along the vehicle front-rear direction along a peripheral edge on the vehicle width direction outer side of the floor panel 16. Accordingly, collision load input to the side member 28 in an offset collision or the like is dispersed into the rocker 22 through the torque box 30.

Note that in an offset collision of the vehicle 10, it is conceivable that a front wheel moving under collision load might impact a vehicle front portion of the rocker 22. In such an event, it is conceivable that a moment might arise in the torque box 30 about an axis in the vehicle vertical direction so as to pivot about a vehicle front portion of the joint portion between the torque box 30 and the rocker 22, and that this moment would act as a bending moment on the side member 28.

However, in the present exemplary embodiment, as viewed along the vehicle width direction, the rear wall 30C at the vehicle rear of the torque box 30 is disposed at a position overlapping with the rear side wall 32C at the vehicle rear of the crossing member 32. Accordingly, a moment arising in the torque box 30 due to the front wheel moving under collision load is countered due to the rear wall 30C of the torque box 30 being supported by the rear side wall 32C of the crossing member 32 through the side member 28. Accordingly, in the present exemplary embodiment, when collision load is input in an offset collision or the like, the front wheel moving under collision load can be suppressed from affecting the vehicle body frame extending in the vehicle front-rear direction.

Moreover, in the present exemplary embodiment, as viewed along the vehicle width direction the lower side wall 32A configuring the vehicle lower side of the crossing member 32 is coupled to the lower wall 28A configuring the vehicle lower side portion of the side member 28. Accordingly, when one of the side members 28 deforms toward the vehicle width direction inward, load can be transmitted from the lower wall 28A of that side member 28 to the lower side wall 32A of the crossing member 32. Accordingly, when collision load is input to the vehicle 10 in an offset collision or the like, the lower wall 28A of the side member 28 is supported by the lower side wall 32A of the crossing member 32, and as a result, a moment about an axis in the vehicle front-rear direction can be suppressed from arising in the side member 28. Accordingly, in the present exemplary embodiment, the vehicle body frame extending in the vehicle front-rear direction can be supported in a stable state during input of collision load in an offset collision or the like.

In addition, in the present exemplary embodiment, since the battery case 56 is fixed to the lower walls 28A configuring the vehicle lower side portions of the side members 28 using the fastening members 68, a fixing operation is rendered easier than in cases in which, for example, the battery case 56 is fixed to side walls of the side members 28. Note that it is conceivable that stress might concentrate at the fastening locations of the fastening members 68 as a result of compression load or tensile load acting on the side wall of the side member 28 when the side member 28 deforms as a result of collision load in an offset collision or the like. Regarding this point, however, in the present exemplary embodiment stress can be suppressed from concentrating at the fastening locations of the fastening members 68 by fixing the battery case 56 to the lower walls 28A of the side members 28 as described above. Accordingly, in the present exemplary embodiment, the efficiency of a fixing operation of the battery pack 54 can be raised, and the battery pack 54 can be suppressed from separating from the vehicle body 12 when collision load is input to the vehicle body 12 in an offset collision or the like.

Note that in the present exemplary embodiment, as viewed along the vehicle vertical direction, each side member 28 is bent toward the vehicle width direction outward about a boundary at the inflection point PA between the side member front 46 and the side member rear 50. Accordingly, were the crossing member 32 not to be provided, input of collision load to the side members 28 as a result of an offset collision or the like would result in the side member 28 into which the collision load was input undergoing folding deformation originating at the inflection point PA.

However, in the present exemplary embodiment, as viewed along the vehicle vertical direction, the crossing member 32 is disposed along the straight line L5 connecting the inflection points PA together. Accordingly, when the side member 28 is input with collision load in an offset collision or the like, the side member 28 input with collision load can be supported at a location where deformation would otherwise originate. Accordingly, in the present exemplary embodiment, collision load can be supported in an initial input stage of collision load in an offset collision or the like.

Second Exemplary Embodiment

Figure 7:
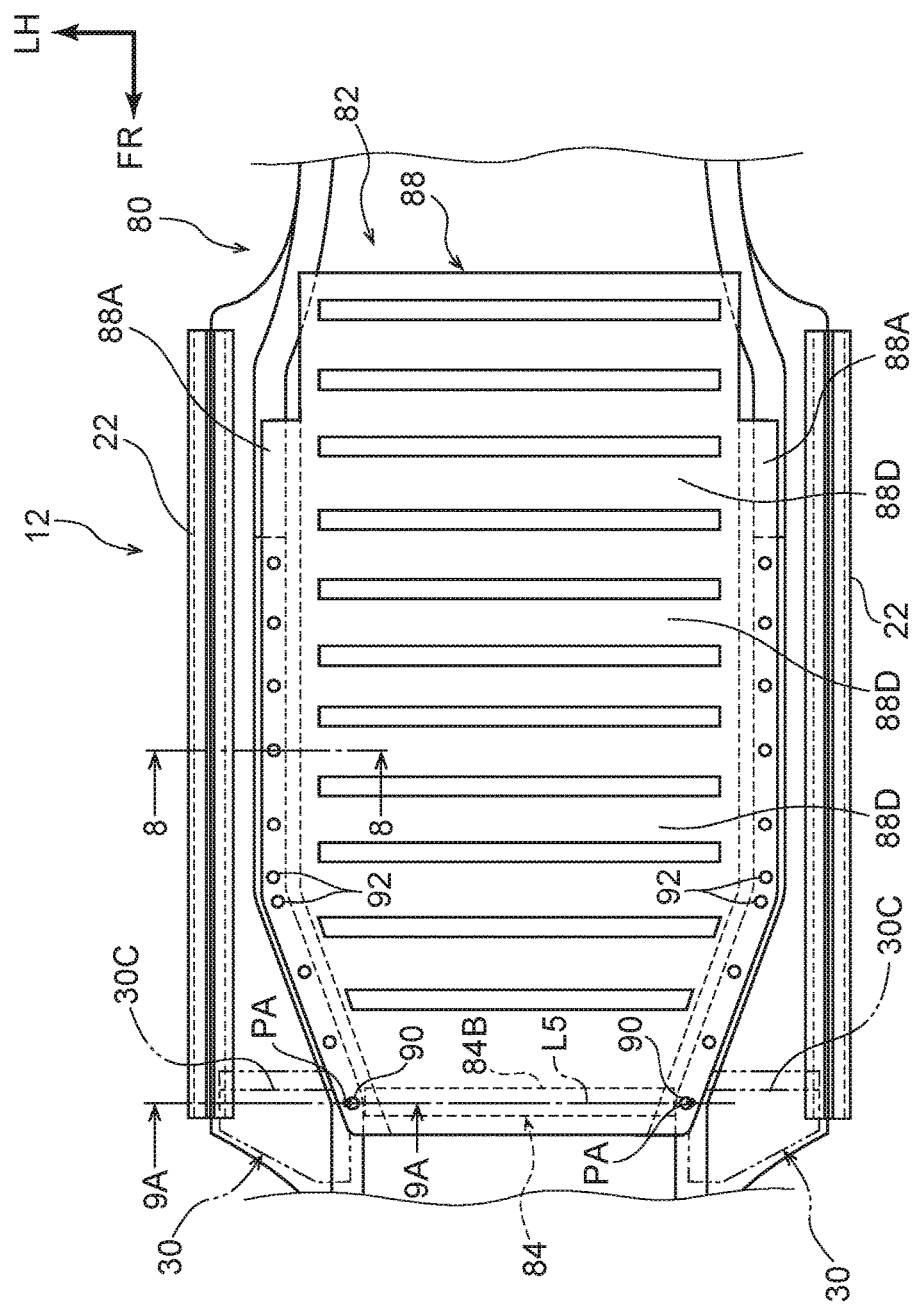
FIG. 7 is a bottom view (bottom view corresponding to FIG. 6) illustrating configuration of a floor section in a vehicle applied with a vehicle lower section structure according to a second exemplary embodiment, as viewed from a vehicle lower side.
Figure 8:
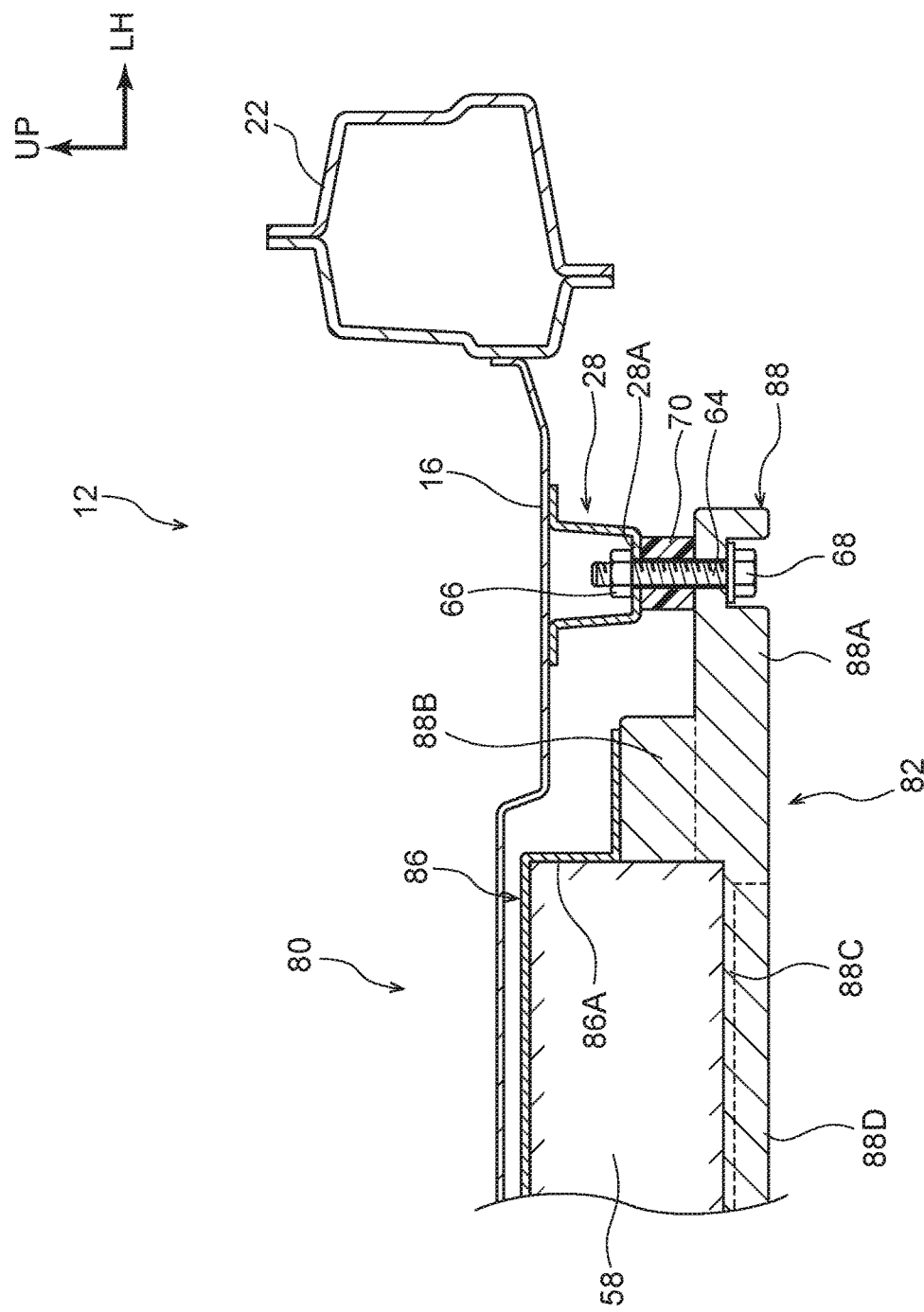
FIG. 8 is an enlarged cross-section (cross-section illustrating a state sectioned along line 8-8 in FIG. 7) illustrating configuration of a battery pack installed to a vehicle applied with a vehicle lower section structure according to the second exemplary embodiment, as viewed from the vehicle front.
Figure 9A:
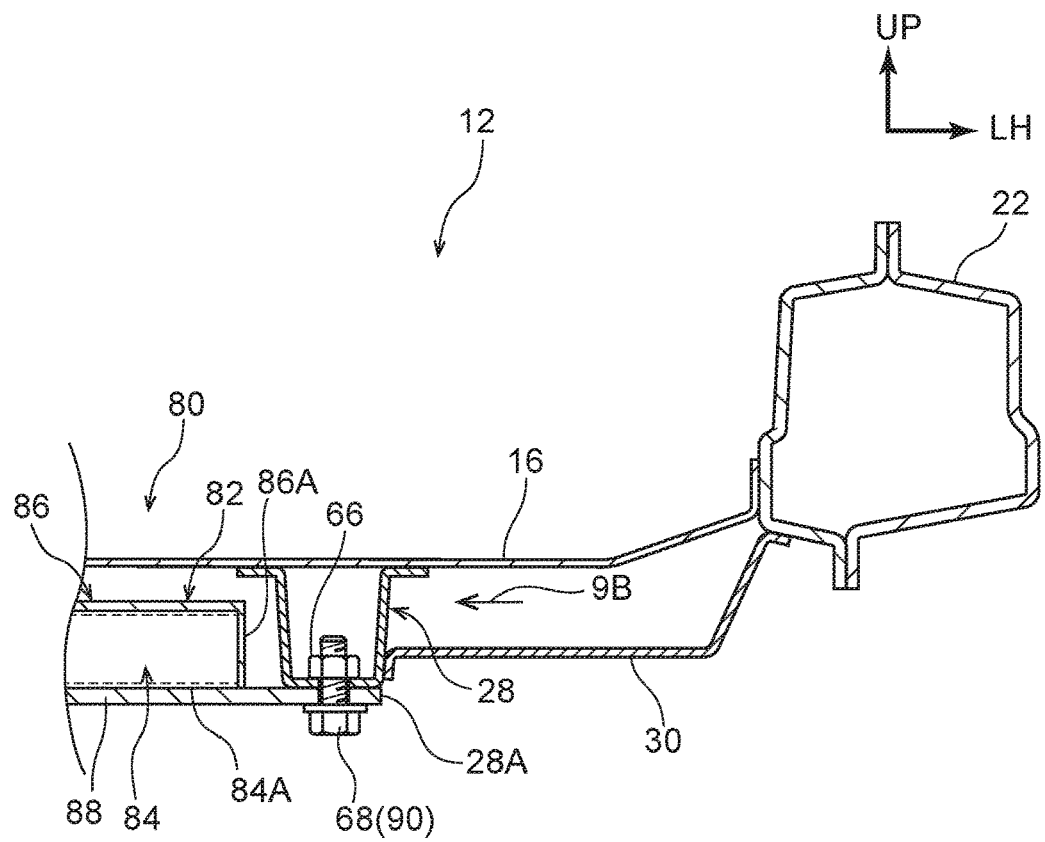
FIG. 9A is a cross-section (cross-section illustrating a state sectioned along line 9A-9A in FIG. 7) illustrating configuration of a battery pack installed to a vehicle applied with a vehicle lower section structure according to the second exemplary embodiment, as viewed from the vehicle front.
Figure 9B:
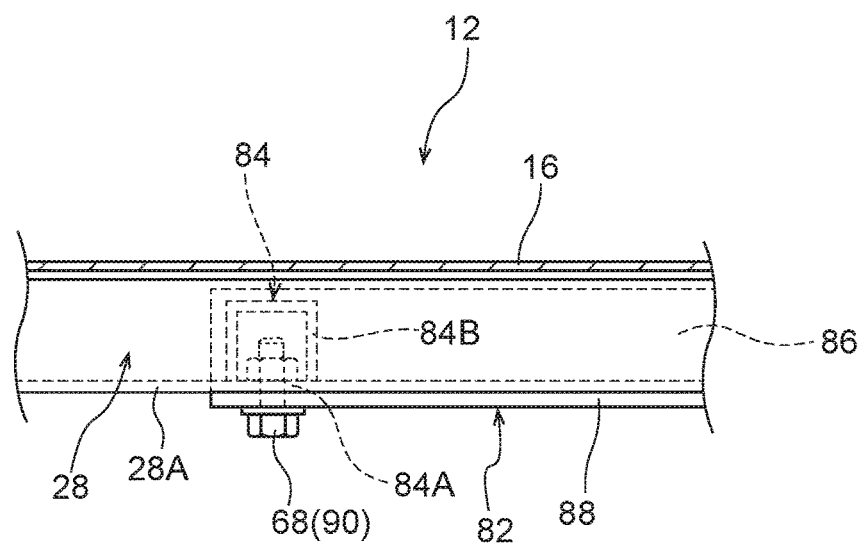
FIG. 9B is a side view (as viewed along the direction of arrow 9B in FIG. 9A) illustrating configuration of a battery pack installed to a vehicle applied with a vehicle lower section structure according to the second exemplary embodiment, as viewed from a vehicle width direction outer side.

Explanation follows regarding a second exemplary embodiment of a vehicle lower section structure according to the present disclosure, with reference to FIG. 7 to FIG. 9. Note that configuration portions matching those of the first exemplary embodiment described above are allocated the same reference numerals, and explanation thereof is omitted.

A feature of the vehicle lower section structure according to the present exemplary embodiment is that instead of the crossing member 32, a reinforcement section 84 is provided inside a battery case 82 of a battery pack 80. In the present exemplary embodiment, the battery case 82 extends further toward the vehicle front than the battery case 56, and is also disposed between the inflection points PA. Moreover, the reinforcement section 84 is disposed inside a vehicle front end portion of the battery case 82.

The reinforcement section 84 is configured from a steel member and has an angular tube shape extending in the vehicle width direction. Similarly to the crossing member 32, the reinforcement section 84 is disposed so as to overlap with the straight line L5 connecting between the inflection points PA. As viewed along the vehicle width direction, the reinforcement section 84 is disposed such that a lower side wall 84A configuring a vehicle lower side portion of the reinforcement section 84 overlaps with the lower walls 28A of the side members 28. Moreover, as viewed along the vehicle width direction, a rear side wall 84B configuring a vehicle rear portion of the reinforcement section 84 is disposed at a position overlapping with the rear wall 30C at the vehicle rear of the torque box 30.

Moreover, the reinforcement section 84 is configured so as to deform less readily than a cover 86 of the battery case 82 with respect to load toward the battery case 82 side. This means that when load of equivalent magnitude toward the vehicle width direction inward is input to the reinforcement section 84 and the cover 86 respectively, a displacement amount (deformation stroke) from an initial position of the vehicle width direction outer side end portion of the reinforcement section 84 is smaller than a displacement amount of a side wall 86A of the cover 86 from its initial position.

Moreover, in the present exemplary embodiment, side face frames 88B, each having a rectangular shaped vertical cross-section, are provided along vehicle width direction inner peripheral edges of respective edges 88A of a base 88 configuring the battery case 82. Furthermore, bottom face frames 88D with a thicker plate thickness than a general portion 88C of the base 88 are provided to a vehicle lower side face of the base 88 so as to couple together the side face frames 88B at predetermined spacings in the vehicle front-rear direction.

In addition, in the present exemplary embodiment, fastening portions 90 for the fastening members 68 that fix the battery case 82 are additionally provided on an extension line of the straight line L5. Note that collars 70 are not disposed at the fastening locations of the fastening portions 90. Moreover, out of the fastening portions for the fastening members 68 that fix the battery case 82, a pair of the fastening portions 92 closest to each inflection point PB is disposed so as to sandwich the inflection point PB in the vehicle front-rear direction.

Such a configuration is capable of exhibiting the same basic operation as that of the first exemplary embodiment described above. Moreover, in the present exemplary embodiment, a load transmission path from one side member 28 to the other side member 28 when the one side member 28 deforms toward the vehicle width direction inward is configured by the reinforcement section 84, enabling the load to be supported by the other side member 28. Accordingly, in the present exemplary embodiment, the vehicle body frame extending in the vehicle front-rear direction can be suppressed from deforming as a result of collision load in an offset collision or the like so as to protrude toward the vehicle width direction inward, without any additional members on the vehicle body 12 side.

Figure 4:
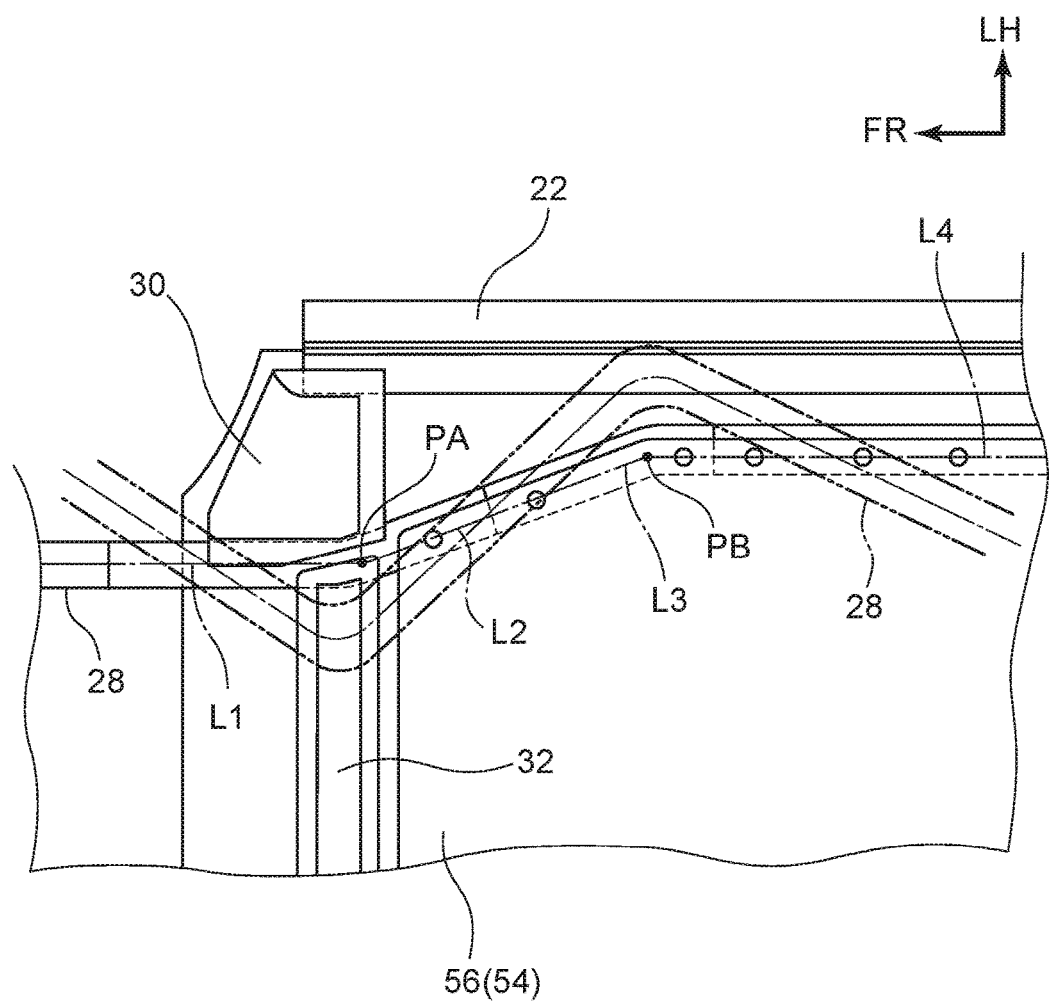
FIG. 4 is a bottom view illustrating a state of a side member prior to collision load input and a state of a side member after collision load input in a vehicle applied with a vehicle lower section structure according to the first exemplary embodiment, as viewed from a vehicle lower side.

Note that as illustrated in FIG. 4, when collision load is input to the side member 28 in an offset collision or the like, it is conceivable that the side member 28 to which the collision load is input might undergo folding deformation so as to protrude toward the vehicle width direction outward originating at the inflection point PB. However, in the present exemplary embodiment, the battery case 82 is reinforced by the side face frame 88B and the bottom face frame 88D, and the fastening portions 92 are disposed so as to sandwich the respective inflection points PB. Accordingly, the side member 28 to which collision load has been input can be suppressed from undergoing folding deformation so as to protrude toward the vehicle width direction outward originating at the inflection point PB.

Supplementary Explanation of the Above Exemplary Embodiments (1) In the first exemplary embodiment described above, the crossing member 32 is joined to the vehicle body 12. However, configuration may be made in which the crossing member 32 is fixed to the vehicle body 12 using a fastening member. Such a configuration enables a reduction in the locations where the vehicle body 12 is modified as a result of providing the crossing member 32. Note that the position of the crossing member 32 is not limited to the position described above, and the position of the crossing member 32 may be modified as appropriate depending on the configuration of the vehicle body 12, as long as it is between the inflected portions 48.

(2) In the first exemplary embodiment described above, configuration is made in which the side member 28 is bent at the location provided with the inflected portion 48. However, depending on the configuration of the vehicle body 12, configuration may be made in which the side member 28 is curved at the location provided with the inflected portion 48.

(3) In the second exemplary embodiment described above, the battery case 82 and the reinforcement section 84 are configured as separate bodies. However, the battery case 82 and the reinforcement section 84 may be configured integrally to one another. Moreover, depending on the configuration of the vehicle body 12, the material from which the reinforcement section 84 is manufactured may be aluminum, or may be a carbon fiber reinforced plastic.

(4) In the second exemplary embodiment described above, the fastening portions 90 are provided in order to position the battery case 82, and therefore the reinforcement section 84, between the inflected portions 48 with respect to the side members 28. However, configuration may be made in which the fastening portions 90 are not provided. Such a configuration enables the assembly precision demanded between the battery case 82 and the side members 28 to be relaxed.

(5) In the exemplary embodiments described above, the vehicle lower section structure according to the exemplary embodiments described above are applied to the vehicle 10 installed with a battery pack. However, the vehicle lower section structure according to the exemplary embodiments described above may be applied to a vehicle installed with a fuel cell stack.

What is claimed is:

1. A vehicle lower section structure comprising:
   a floor panel configuring part of a floor section of a vehicle body having a monocoque structure;
   a pair of left and right side members configuring part of a frame extending in a vehicle front-rear direction of the vehicle body, each side member including:
      a side member front extending straight along the vehicle front-rear direction as viewed along a vehicle vertical direction; and
      a side member rear joined to the floor panel at a vehicle lower side of the floor panel, and provided with an inflected portion extending from the side member front so as to spread out toward a vehicle width direction outward as viewed along the vehicle vertical direction;
   a power supply section disposed between the side members at the vehicle lower side of the floor panel and configured to supply power to a power unit installed to the vehicle;
   a crossing section running along the vehicle width direction between the inflected portions and configured to transmit a load from one of the side members to the other of the side members in a case in which the one side member deforms toward the vehicle width direction inward; and
   a torque box disposed at a vehicle width direction outer side of the one side member, a vertical wall of the torque box at a vehicle rear of the torque box as viewed along the vehicle width direction being disposed at a position overlapping with a vertical wall at a vehicle rear of the crossing section, and being joined to the one side member and to a rocker extending in the vehicle front-rear direction along a peripheral edge on a vehicle width direction outer side of the floor panel.

2. The vehicle lower section structure of claim 1, wherein:
   as viewed along the vehicle width direction, a lower side wall configuring a vehicle lower side of the reinforcement section is disposed so as to overlap with a lower wall configuring a vehicle lower side portion of the one side member, or is coupled to the lower wall; and the load can be transmitted from the lower wall to the lower side wall.

3. The vehicle lower section structure of claim 1, further comprising:

a battery case configuring an outer shell of the power supply section; and a reinforcement section serving as the crossing section disposed inside the battery case, wherein the reinforcement section is configured so as to deform less readily than the battery case with respect to the load.

4. The vehicle lower section structure of claim 1, wherein the battery case is fixed to a lower wall configuring a vehicle lower side portion of the one side member via a fastening member.

5. The vehicle lower section structure of claim 1, wherein as viewed along the vehicle vertical direction, the reinforcement section is disposed on a straight line connecting an inflection point between the side member front and the side member rear of the one side member to an inflection point between the side member front and the side member rear of the other side member.

6. A vehicle lower section structure comprising:

a floor panel configuring part of a floor section of a vehicle body having a monocoque structure;

a pair of left and right side members configuring part of a frame extending in a vehicle front-rear direction of the vehicle body, each side member including:

a side member front extending straight along the vehicle front-rear direction as viewed along a vehicle vertical direction; and a side member rear joined to the floor panel at a vehicle lower side of the floor panel, and provided with an inflected portion extending from the side member front so as to spread out toward a vehicle width direction outward as viewed along the vehicle vertical direction;

a power supply section disposed between the side members at the vehicle lower side of the floor panel and configured to supply power to a power unit installed to the vehicle;

a crossing section coupling the side members together, the crossing section being, as viewed along the vehicle vertical direction, disposed between the inflected portions on a straight line connecting an inflection point between the side member front and the side member rear of one of the side members to an inflection point between the side member front and the side member rear of the other of the side members; and a torque box disposed at a vehicle width direction outer side of the one side member, a vertical wall of the torque box at a vehicle rear of the torque box as viewed along the vehicle width direction being disposed at a position overlapping with a vertical wall at a vehicle rear of the crossing section, and being joined to the one side member and to a rocker extending in the vehicle front-rear direction along a peripheral edge on a vehicle width direction outer side of the floor panel.

7. A vehicle lower section structure comprising:

a floor panel configuring part of a floor section of a vehicle body having a monocoque structure;

a pair of left and right side members configuring part of a frame extending in a vehicle front-rear direction of the vehicle body, each side member including:

a side member front extending straight along the vehicle front-rear direction as viewed along a vehicle vertical direction; and a side member rear joined to the floor panel at a vehicle lower side of the floor panel, and provided with an inflected portion extending from the side member front so as to spread out toward a vehicle width direction outward as viewed along the vehicle vertical direction;

a power supply section disposed between the side members at the vehicle lower side of the floor panel and configured to supply power to a power unit installed to the vehicle;

a battery case configuring an outer shell of the power supply section; and a reinforcement section disposed inside the battery case and running along the vehicle width direction between the inflected portions and configured to transmit a load from one of the side members to the other of the side members in a case in which the one side member deforms toward the vehicle width direction inward, the reinforcement section being configured so as to deform less readily than the battery case with respect to the load.

8. A vehicle lower section structure comprising:

a floor panel configuring part of a floor section of a vehicle body having a monocoque structure;

a pair of left and right side members configuring part of a frame extending in a vehicle front-rear direction of the vehicle body, each side member including:

a side member front extending straight along the vehicle front-rear direction as viewed along a vehicle vertical direction; and a side member rear joined to the floor panel at a vehicle lower side of the floor panel, and provided with an inflected portion extending from the side member front so as to spread out toward a vehicle width direction outward as viewed along the vehicle vertical direction;

a power supply section disposed between the side members at the vehicle lower side of the floor panel and configured to supply power to a power unit installed to the vehicle;

a battery case configuring an outer shell of the power supply section; and a reinforcement section disposed inside the battery case and coupling the side members together, the reinforcement section being, as viewed along the vehicle vertical direction, disposed between the inflected portions on a straight line connecting an inflection point between the side member front and the side member rear of one of the side members to an inflection point between the side member front and the side member rear of the other of the side members, the reinforcement section being configured so as to deform less readily than the battery case with respect to a load.

* * * * *